US005561450A

United States Patent [19]

Brewster, Jr. et al.

[11] Patent Number: 5,561,450

[45] Date of Patent: Oct. 1, 1996

[54] APPARATUS FOR MOUNTING AN INK JET CARTRIDGE ON A SUPPORT THEREFOR

[75] Inventors: William H. Brewster, Jr., Fairfield; Joseph D. Collins, Shelton; Paul R. Sette, Branford, all of Conn.

[73] Assignee: Pitney Bowes Inc., Stamford, Conn.

[21] Appl. No.: 954,191

[22] Filed: Sep. 30, 1992

[51] Int. Cl.$^6$ .......... G01D 15/16

[52] U.S. Cl. .......... 347/49; 347/87

[58] Field of Search .......... 346/140 R; 347/86, 347/49, 50, 87; 312/9.55, 9.57, 9.63

[56] References Cited

U.S. PATENT DOCUMENTS

| | | | |
|---|---|---|---|
| 4,500,895 | 2/1985 | Buck et al. | 347/87 |
| 4,635,080 | 1/1987 | Watanabe | 347/49 |
| 4,755,836 | 7/1988 | Ta et al. | 347/49 |
| 4,760,409 | 7/1988 | Kiyohara et al. | 347/86 |
| 4,844,564 | 7/1989 | Price, Sr. et al. | 312/12 |
| 4,907,018 | 3/1990 | Pinkerpall et al. | 346/139 R |

FOREIGN PATENT DOCUMENTS

| | | |
|---|---|---|
| 0313205 | 9/1988 | European Pat. Off. . |
| 0376719 | 12/1989 | European Pat. Off. . |

*Primary Examiner*—Benjamin R. Fuller
*Assistant Examiner*—Craig A. Hallacher
*Attorney, Agent, or Firm*—Robert H. Whisker; Melvin J. Scolnick; David E. Pitchenik

[57] ABSTRACT

In a printing system including an ink jet printhead, a supply of ink therefor, and structure for controlling the printhead for ejecting ink droplets therefrom, apparatus comprising, a disposable cartridge including the ink supply and printhead, the cartridge including a front wall and a base wall, the cartridge base wall including a foot portion extending to the cartridge front wall and defining therewith a lower frontal edge, structure for supporting the cartridge, the supporting structure including a front wall, the supporting structure including a portion of the printhead controlling structure, the portion including an electrical connector overlaying the supporting structure front wall, the connector including a plurality of exposed electrical terminals, the supporting structure including oppositely spaced shoe portions extending both toward one another and forwardly of the supporting structure front wall for positioning the cartridge relative to the supporting structure terminals when the cartridge is mounted on the supporting structure, structure for facilitating manually removably mounting the cartridge on the supporting structure, the facilitating structure including a pair of elongate spring finger members oppositely-spaced from one another for receiving therebetween the cartridge and blocking movement of the cartridge into engagement with the supporting structure terminals, the spring finger members each including a free-end portion thereof configured for aligning the cartridge front wall with the supporting structure shoe portions and guiding movement of the cartridge lower frontal edge into seating relationship with the supporting structure shoe portions as the cartridge is being mounted on the supporting structure.

28 Claims, 3 Drawing Sheets

APPARATUS FOR MOUNTING AN INK JET CARTRIDGE ON A SUPPORT THEREFOR

BACKGROUND OF THE INVENTION

This invention is generally concerned with apparatus for mounting an ink jet cartridge on supporting structure, and, more particularly, with apparatus for facilitating manually removably mounting a disposable ink jet cartridge on a support structure.

As shown in U.S. Pat. 4,500,895 for a Disposable Ink Jet Head, issued Feb. 19, 1985 to Buck, et. al., it is known in the art to provide a disposable thermal ink jet print head, and, as shown in U.S. Pat. No. 4,755,836 for a Printhead Cartridge and Carriage Assembly, issued Jul. 5, 1988 to Ta. et. al., it is know in the art to provide an ink jet printhead cartridge and a carrier therefor on which the cartridge is removably mountable.

In addition to the foregoing it is noted that since disposable ink cartridges of the type disclosed in the above patents are commercially available for use in ink jet printing equipment produced by diverse manufacturers, who are obliged to design the supporting structure on which the ink jet cartridge is removably mountable in consideration of the environment of the particular equipment in which the cartridge is to be used, the cartridge supporting structure found in a given manufacturer's product may be quite different from the corresponding structure found in another manufacturer's product. Thus, in the environment of the product with which the present invention is concerned, the supporting structure is constructed and arranged such that when mounting or dismounting disposable cartridges, the electrical terminals of the supporting structure tend to be abraded over time due to insufficient care being taken by customers to avoid contacting the terminals with the cartridges. As the result of such damage, signalled by the printing quality of the product correspondingly deteriorating over time, customer dissatisfaction with product performance has become widespread. Accordingly:

- an object of the invention is to provide apparatus for facilitating removably mounting a disposable ink jet printing cartridge on supporting structure therefor;
- another object is to provide apparatus for facilitating mounting a disposable ink jet printing cartridge on supporting structure, and dismounting the cartridge therefrom, while avoiding damage to the supporting structure; and
- yet another object is to provide apparatus for facilitating removably mounting a disposable ink jet printing cartridge on supporting structure, having electrical terminals, in a manner such that damage to the terminals is avoided.

SUMMARY OF THE INVENTION

In a printing system including an ink jet printhead, a supply of ink therefor, and means for controlling the printhead for ejecting ink droplets therefrom, apparatus comprising, a disposable cartridge including the ink supply and printhead, the cartridge including a front wall and a base wall, the cartridge base wall including a foot portion extending to the cartridge front wall and defining therewith a lower frontal edge, means for supporting the cartridge, the supporting means including a front wall, the supporting means including a portion of the printhead controlling means, the portion including an electrical connector overlaying the supporting means front wall, the connector including a plurality of exposed electrical terminals, the supporting means including oppositely spaced shoe portions extending both toward one another and forwardly of the supporting means front wall for positioning the cartridge relative to the supporting means terminals when the cartridge is mounted on the supporting means; means for facilitating manually removably mounting the cartridge on the supporting means, the facilitating means including a pair of elongate spring finger members oppositely-spaced from one another for receiving therebetween the cartridge and blocking movement of the cartridge into engagement with the supporting means terminals, the spring finger members each including a free-end portion thereof configured for aligning the cartridge front wall with the supporting means shoe portions and guiding movement of the cartridge lower frontal edge into seating relationship with the supporting means shoe portions as the cartridge is being mounted on the supporting means.

BRIEF DESCRIPTIONS OF THE DRAWINGS

As shown in the drawings wherein like reference numerals designate like or corresponding parts throughout the several views.

DESCRIPTION OF THE PREFERRED EMBODIMENTS

Figure 1:
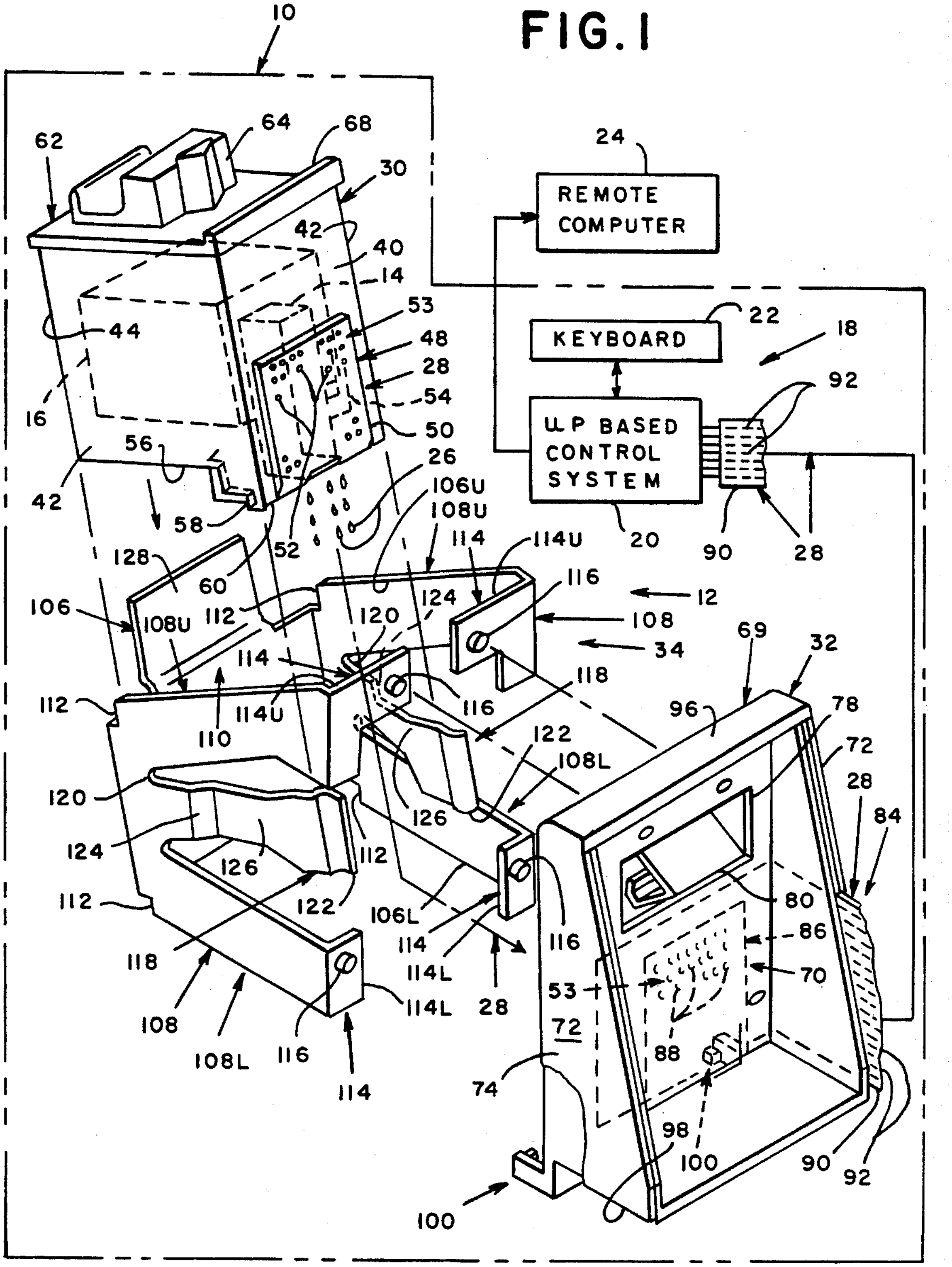
FIG. 1 is an exploded perspective view of the apparatus according to the invention, including the combination of cartridge supporting structure, an ink jet printing cartridge removably mountable thereon and structure for facilitating mounting and dismounting the cartridge.

As shown in FIG. 1, an ink jet printing system 10, of the type in which the apparatus 12 according to the invention may be embodied, generally includes a thermal, ink jet, printhead 14, a supply of ink 16 therefor and structure 18 for controlling the printhead 14. The controlling structure 18 generally includes a conventional microprocessor based control system 20, operable in response to suitable inputs from a conventional keyboard 22 and remote computer 24 for causing ink droplets 26 to be ejected from the printhead 14. In addition, the controlling structure 18 generally includes a conventional electrical line 28 interconnecting the microprocessor control system 20 and printhead 14. And, the apparatus 12 according to the invention preferably includes a disposable, thermal, ink jet printing cartridge 30, supporting structure 32 for the cartridge 30, and structure 34 for facilitating removably mounting the cartridge 30 on the supporting structure 34.

Figure 4:
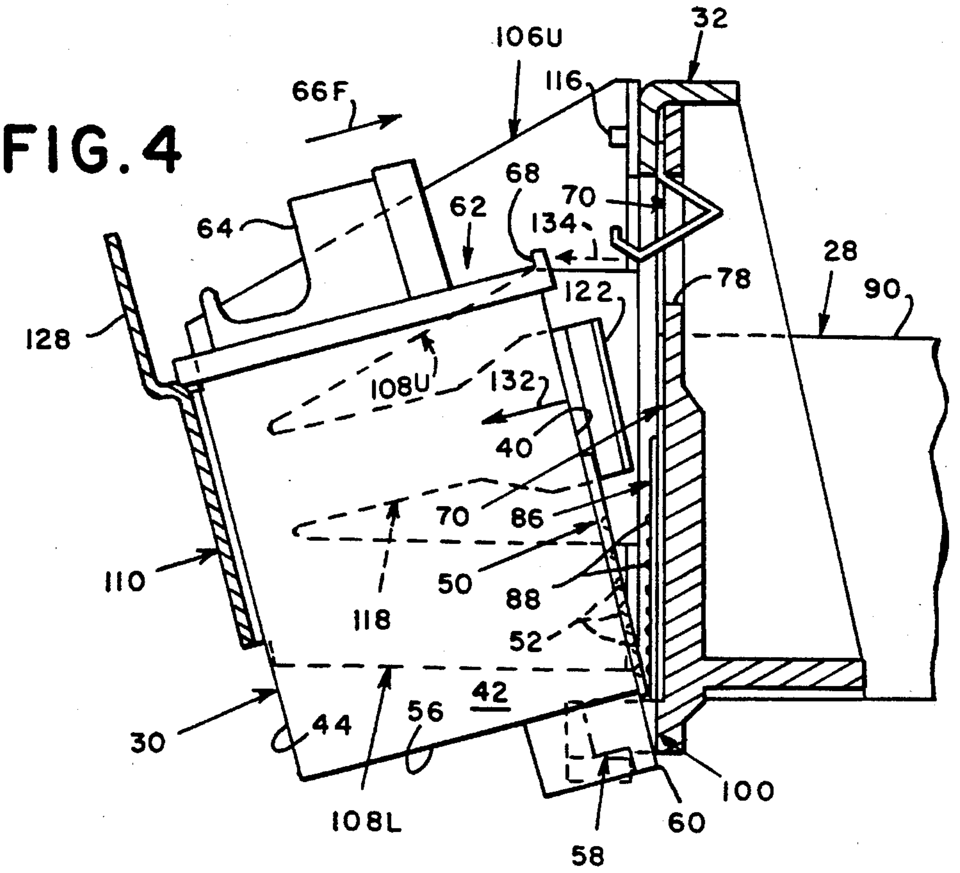
FIG. 4 is a side elevation view of the apparatus of FIG. 3 showing the cartridge partially mounted on the supporting structure.
Figure 5:
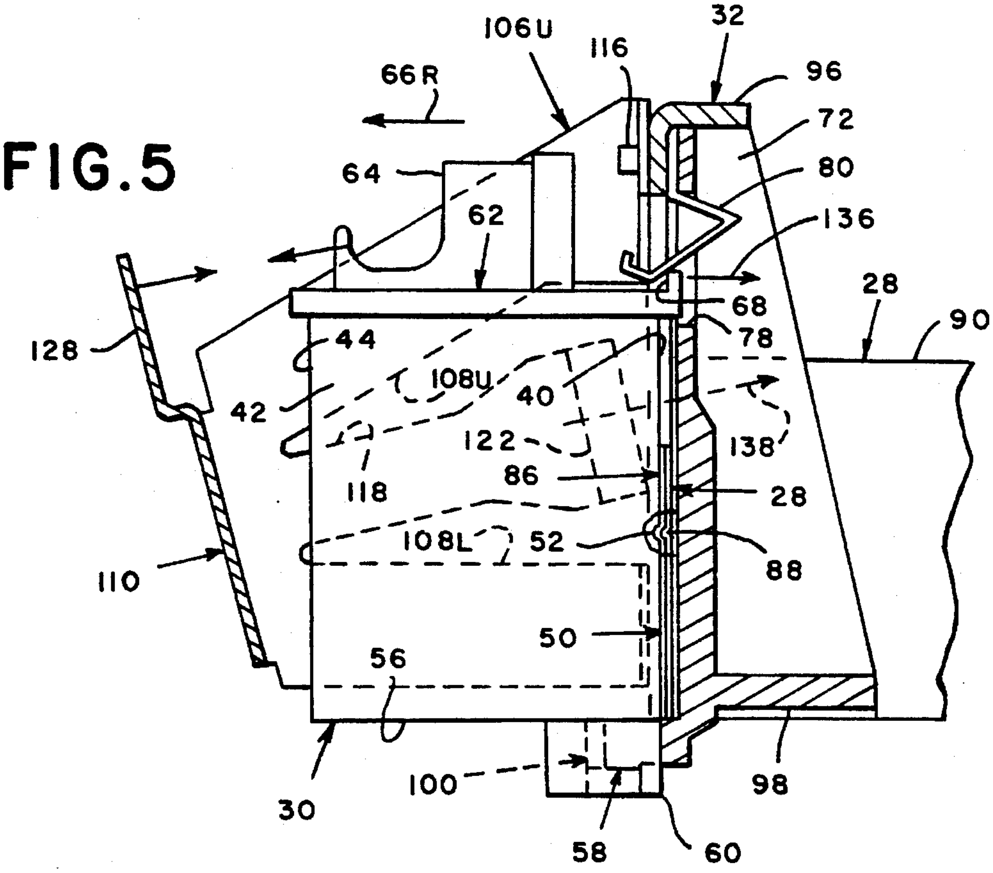
FIG. 5 is a side elevation view of the apparatus of FIG. 4 showing the cartridge fully mounted on the supporting structure and latched in place thereon.

The cartridge 30 (FIG. 1) includes a front wall 40 and opposed side walls 42, and includes a rear wall 44 which is oppositely spaced from the front wall 42. Each of walls, 40, 42 and 44, is generally rectangularly-shaped and substantially flat. In addition, the cartridge 30 includes a first portion 48 of the printhead controlling structure 18, and, more particularly, of the electrical line 28. The first portion 48 preferably includes a first, substantially flat, electrical, connector 50, overlaying the cartridge front wall 40 and conventionally fixedly attached thereto in a predetermined position. Preferably, the first connector 50 includes a plurality of exposed, first, electrical, terminals 52, which are formed therein in a predetermined pattern 53, for example as shown in FIG. 1, and are conventionally configured for electrical interconnection with mating terminals of supporting structure 32. Further, the first portion 48 of the printhead controlling structure 18 preferably includes a plurality of conventional electrical leads 54 which extend between the first connector 50 and printhead 14. Moreover, the cartridge 30 includes a base wall 56 having a frontal, depending, foot portion 58, which extends to the cartridge front wall 40 and defines therewith a lower, frontal, edge 60. Still further, opposite the base wall 56, the cartridge 30 includes a top wall 62 having an elevated portion 64 which is constructed and arranged to permit a user, on the one hand, to manually push the cartridge 30 in one direction 66F (FIG. 4), i.e., forwardly, for causing the cartridge 30 to be urged into electrical engagement with the supporting structure 32 and, on the other hand, to manually pull the cartridge 30 in the opposite direction 66R (FIG. 5), i.e., rearwardly, for causing the cartridge 30 to be urged out of electrical engagement with the supporting structure 32. And, the cartridge 30 includes a frontal, elevated, lip portion 68, which is provided to permit the cartridge 30 to be held in place by the supporting structure 32, as hereinafter discussed.

Figure 2:
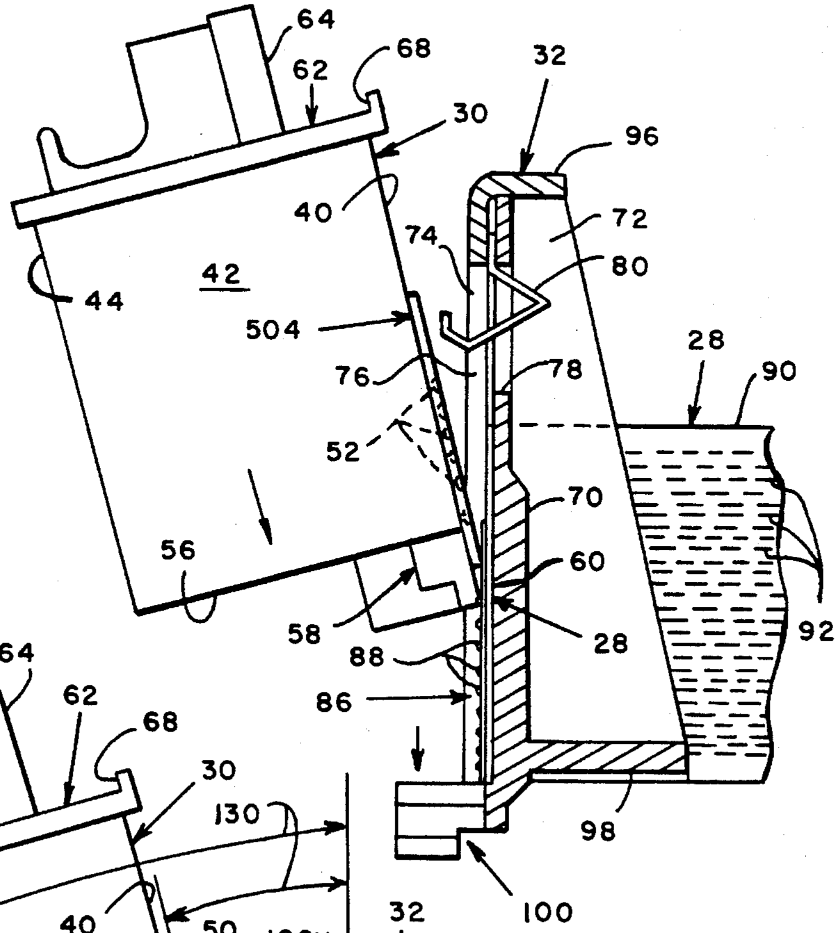
FIG. 2 (PRIOR ART)
FIG. 2 is a side elevation view of a prior art ink jet printing cartridge and supporting structure, showing the manner in which the cartridge may cause damage to the electrical terminals of the supporting structure in the course of mounting or dismounting the cartridge.

The supporting structure 32 (FIG. 1) includes framework 69, which is made of a suitable plastic material, is conventionally fixedly attached to the system 10, and includes a front wall 70 and oppositely-spaced side walls 72, each of which predominately extends rearwardly of the front wall 70 but also includes a portion 74 (FIG. 2) thereof which extends forwardly of the front wall 70 to form therewith a channel 76 for receiving the cartridge 30 (FIG. 1). Each of the walls, 70 and 72, is generally rectangularly-shaped and substantially flat. In addition, the front wall 70 includes an aperture 78 formed therein. And the supporting structure 32 includes a latch 80, which is made of a resilient material, such as spring steel, is fixedly attached to the supporting structure front wall 70 (FIG. 2) above the aperture 78, and is suitably constructed and arranged to extend through the aperture 78 for engaging the cartridge frontal lip portion 68 (FIG. 5) when the cartridge 30 is urged into engagement with the latch 80. Further, the supporting structure 32 (FIG. 1) includes a second portion 84 of the printhead controlling structure 18 and, more particularly, of the electrical line 28. The second portion 84 preferably includes a second, substantially flat, electrical connector 86, which overlays the supporting structure front wall 70 and is conventionally fixedly attached thereto in a predetermined position. Preferably, the second connector 86 includes a plurality of exposed, second, electrical terminals 88, which are formed therein in the same predetermined pattern 53 as that of the cartridge terminals 52 and are conventionally configured for mating, for example as shown in FIG. 2, with the correspondingly located terminals 52 of the cartridge 30. Further, the second portion 84 (FIG. 1), of the printhead controlling structure 18, preferably includes a strip-type electrical line 90, including a plurality of electrical leads 92, which respectively extend between the terminals 88 of the second connector 86 and the local microprocessor based control system 20. Moreover, the supporting structure 32 includes a top wall 96, and, opposite thereto, a base wall 98 which preferably includes a pair of oppositely spaced, shoe, portions 100. The shoe portions 100 each extend both forwardly from beneath the forwardly-extending portions 74 of the supporting structure side walls 72 and partially toward one another, in a generally hook-shaped configuration, for receiving in seating relationship therewith the cartridge lower, frontal, edge 60 and associated foot portion 58 in a manner such that cartridge front wall 40 (FIG. 5) is both vertically and laterally positioned relative to the supporting structure front wall 70 for aligning each of the cartridge terminals 52 in mating relationship with each of the corresponding supporting structure electrical terminals 88, when the cartridge 30 is mounted on the supporting structure 32.

As shown in FIG. 1, the structure 34 for facilitating manually mounting the cartridge 30 on the supporting structure 32 is dimensioned for receiving the cartridge 30 therewithin, aligning the lower, frontal, edge 60 thereof with the supporting structure shoe portions 100 and guiding the cartridge lower, frontal, edge 60, out of abrading relationship with the supporting structure electrical connector 86 and into seating relationship with the shoe portions 100. To that end, the facilitating structure 34 comprises a generally channel-shaped frame 106, which made of a suitable metal material, is substantially U-shaped in transverse cross-section and has upper and lower open ends 106U and 106L. The frame 106, which is shown fixedly attached to the supporting structure framework 69 (FIG. 3), may be integrally molded therewith, for example as by injection molding from a suitable plastic material, without departing from the spirit and scope of the invention. The frame 106 (FIG. 1) generally includes oppositely spaced side walls 108 extending forwardly of the supporting structure front wall 70, and includes a back wall 110 extending between the side walls 108. Each of the side walls 108 preferably includes upper and lower, elongate, portions, 108U and 108L, which are vertically-spaced from one another, have one end 112 integrally formed with the back wall 110 and the other end 114 fixedly attached to the supporting structure 32, for example as by means of upper and lower tabs, 114U and 114L, integrally formed therewith and secured to the supporting structure front wall 70 as by means of fasteners 116. In addition, each of the side walls 108 preferably includes an elongate, spring finger member 118 which is generally disposed between the associated upper and lower, side wall portions, 108U and 108L. The spring finger members 118 each have one end 120 integrally formed with the back wall 110, generally extend therefrom toward the supporting structure front wall 70 and have a free end portion 122 which is spaced forwardly of the supporting structure front wall 70. Preferably, the spring finger members 118 each include a rear portion 124 which angularly extends partially inwardly of the associated side wall portions, 108U and 108L, and toward the opposite spring finger member 118, whereby the members 118 partially converge toward one another as they extend toward the supporting member front wall 70. And, the spring finger members 118 each include a forward portion 126, extending substantially parallel to the opposite spring finger member's forward portion 126, between the rear portion 124 and free end portion 122. Further, each of the free end portions 122 is an elongate portion extending transversely of the longitudinally length of the spring finger member 118 and is arcuately-shaped, in transverse cross-section so as to extend inwardly of the frame 106. In addition, the frame back wall 110 extends substantially parallel to the longitudinal length of each of the spring finger member free-end portions 122 and is spaced a predetermined distance "d" (FIG. 3) therefrom for receiving therebetween the cartridge 30. Preferably, the distance "d" is greater than the distance "$d_1$" between the cartridge front and rear walls, 40 and 44, to loosely accommodate receiving the cartridge 30. And, preferably, the finger member free-end portions 122 longitudinally-extend at a predetermined angle 130 (FIG. 2), relative to the supporting structure front wall, extending through the shoe portions 100, of from ten to twenty degrees and, more preferably, substantially fifteen degrees. Thus, the parallel-spaced back wall 110 longitudinally extends at the same predetermined angle 130 relative to the supporting structure front wall 70. Moreover, the frame back wall 110 (FIG. 1) includes a tab portion 128 thereof which extends upwardly of the open upper end 106U of the frame 106, and thus upwardly of the frame side walls 108.

Figure 3:
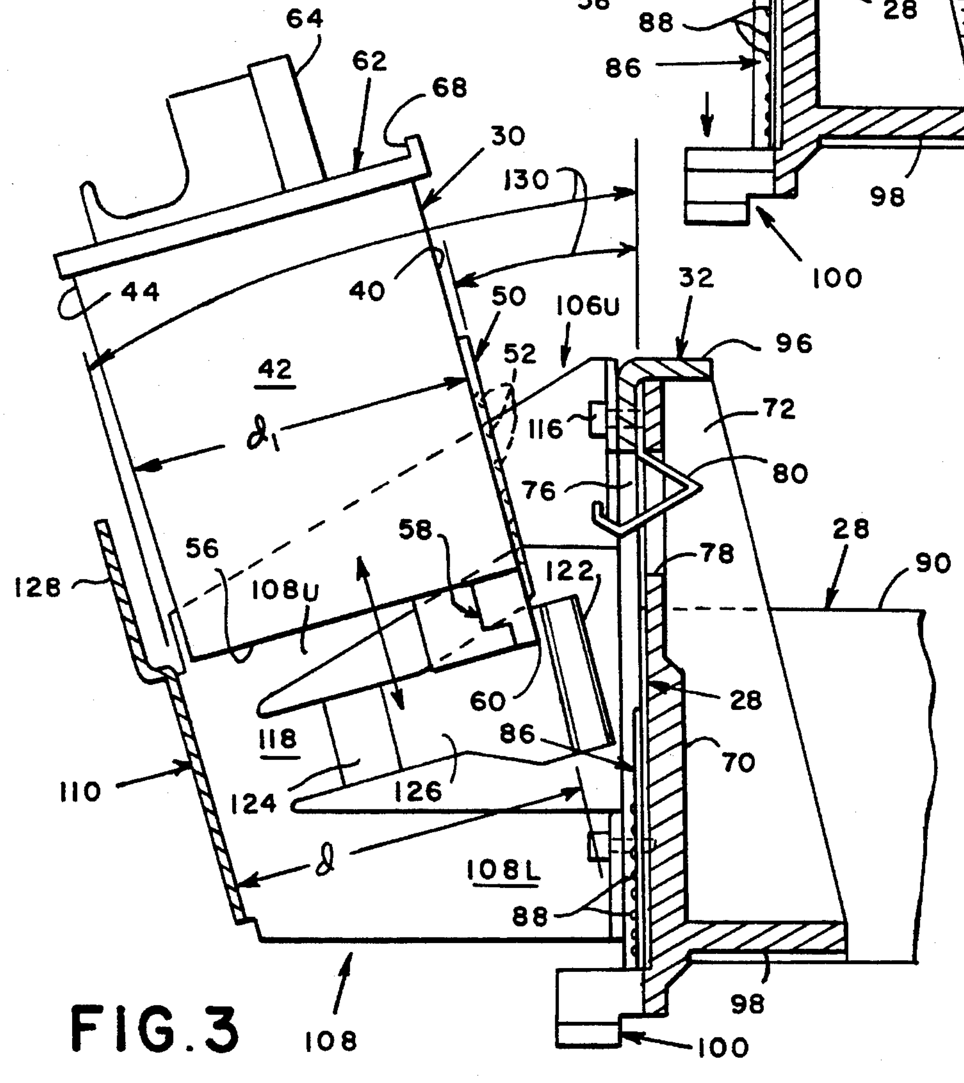
FIG. 3 is a side elevation view of the apparatus of FIG. 1 showing the cartridge in the process of being initially mounted on supporting structure.

As thus constructed and arranged, the frame back wall 110 (FIG. 3) and spring finger member free-end portions 122 are each oriented relative to the supporting structure front wall 70 for aligning the cartridge front wall 40 with the supporting structure shoe portions 100 and guiding movement of the cartridge lower frontal edge 60, out of abrading relationship with the supporting structure front wall 70, and thus out of abrading relationship with the connector 86 and terminals 88 thereof, and into seating relationship with the supporting structure shoe portions 100, as the cartridge 30 is lowered, via the frame's open upper end 106U, into and within the frame 106, and thus within the facilitating structure 34. As the cartridge 30 is thus lowered, the cartridge rear wall 44 is guided downwardly by the frame back wall 110, and the cartridge front wall 40 is guided downwardly by the spring finger member free-end portions 122, which block forward movement 66F (FIG. 4) of the cartridge 30 toward the supporting structure 32, thereby guiding the cartridge 30 out of abrading relationship with the supporting structure front wall 70, until the cartridge lower frontal edge 60 is seated on the supporting structure shoe portions 100. Thereafter, the cartridge top wall elevated portion 64 may be pushed forwardly 66F (FIG. 4) for pivoting the cartridge 30 toward the supporting structure front wall 70, about the supporting structure foot portion 100, against a resilient force 132 exerted by the spring finger member free end portions 122 on the cartridge front wall 40, and thus out of latching relationship therewith. Whereupon, the top wall frontal lip portion 68 may be urged, against a resilient force 134 exerted by the supporting structure latch 80, into latching engagement by the latch 80 (FIG. 5) for seating and holding the cartridge foot portion 58 in place on the supporting structure shoe portion 100, whereby the cartridge terminals 52 are positioned relative to the supporting structure terminal 88 for electrically interconnecting the terminals 52 and 58 with one another, for and thus electrically connecting the ink jet cartridge 40 (FIG. 1) with the microprocessor based control structure 20. For disposing of or replacing the ink jet printing cartridge 40, for example when the ink supply 16 thereof is depleted, the facilitating structure tab portion 128 (FIG. 5) and cartridge elevated portion 64 may be simultaneously manually grasped to pull the cartridge rearwardly 66R for pivoting the cartridge 30 away from the supporting structure front wall 70, about the supporting structure foot portion 100, initially against a resilient force 136 exerted by the latch 80 on the cartridge frontal lip portion 68, to unlatch the cartridge 30 from the supporting structure 32, and then against a frictional resilient force 138 exerted by the spring finger member free end portions 122 on the cartridge side walls 42, to urge the cartridge front wall 40 into latching engagement by the spring finger free end portions 122 (FIG. 3). Whereupon the top wall elevated portion 64 may be grasped to raise the cartridge 30 away from the supporting structure foot portion 100. As the cartridge 30 is thus raised, the cartridge rear wall 44 is guided upwardly by the frame back wall 110 and the cartridge front wall 40 is guided upwardly by the spring finger member free end portions 122, to hold the cartridge 30, and thus the terminals 88 thereof, out of abrading relationship with supporting structure 32 until the cartridge lower frontal edge 60 clears the frame upper open end 106U.

In accordance with the objects of the invention there has been described apparatus 34 (FIG. 1) for facilitating mounting a disposable ink jet printing cartridge 30 on supporting structure 32 therefor, and, dismounting the cartridge 30 therefrom, while avoiding damage to the supporting structure 32 and, in particular, to the electrical terminals 88 thereof.

What is claimed is:

1. A printing apparatus, comprising:

(a) an inkjet printhead and a supply of ink therefor;

(b) means for controlling the printhead for ejecting ink droplets therefrom;

(c) a disposable cartridge including the ink supply and printhead, the cartridge including a front wall and a base wall, the cartridge base wall including a foot portion extending to the cartridge front wall and defining therewith a lower frontal edge;

(d) means for supporting the cartridge, the supporting means including a front wall, the supporting means including a portion of the printhead controlling means, the portion including an electrical connector overlaying the supporting means front wall, the connector including a plurality of exposed electrical terminals, the supporting means including oppositely spaced shoe portions extending both toward one another and forwardly of the supporting means front wall for positioning the cartridge relative to the supporting means terminals when the cartridge is mounted on the supporting means, the supporting means including a latch fixedly attached to the supporting structure front wall whereby the top wall frontal lip portion of the cartridge may be urged against a resilient force exerted by the supporting structure latch into latching engagement with the latch;

(e) means for facilitating manually removably mounting the cartridge on the supporting means, the facilitating means including a pair of elongate spring finger members oppositely-spaced from one another for receiving therebetween the cartridge and blocking movement of the cartridge into engagement with the supporting means terminals, the spring finger members each including a free-end portion thereof configured for aligning the cartridge front wall with the supporting means shoe portions and guiding movement of the cartridge lower frontal edge into seating relationship with the supporting means shoe portions as the cartridge is being mounted on the supporting means.

2. The apparatus according to claim 1, wherein each of the spring finger members free-end portion extends transversely of the spring finger member and is an elongate portion having an arcuately-shaped transverse cross-section, and the free-end portions each longitudinally-extending at an angle of from ten to twenty degrees relative to the supporting means front wall.

3. The apparatus according to claim 2, wherein said angle is substantially fifteen degrees.

4. The apparatus according to claim 1, wherein said facilitating means includes oppositely-spaced side wall portions extending forwardly of the supporting means front wall, the facilitating means including an elongate back wall portion supported by the facilitating means side wall portions at an angle of from ten to twenty degrees relative to the supporting means front wall, and the spring finger members extending from the back wall portion toward the supporting means front wall.

5. The apparatus according to claim 4 wherein the angle is substantially fifteen degrees.

6. The apparatus according to claim 4, wherein each of the spring finger members free-end portion is an elongate portion longitudinally-extending substantially parallel to the back wall portion for receiving therebetween the cartridge.

7. The apparatus according to claim 1, wherein each of the spring finger member free-end portions is disposed in latching relationship with the cartridge front wall when the cartridge lower frontal marginal edge is seated on the supporting means shoe portions.

8. The apparatus according to claim 1, wherein the cartridge includes a top wall, the top wall including an elevated portion thereof configured to permit manually pivoting the cartridge toward the supporting means against a resilient force exerted by each of the spring finger members when the cartridge lower frontal edge is seated in the shoe portions for seating the foot portion on the shoe portions.

9. The apparatus according to claim 8, wherein the facilitating means includes oppositely-spaced side wall portions extending forwardly of the supporting means front wall, the facilitating means including a back wall portion supported by the facilitating means side wall portions forwardly of the supporting means front wall, and the back wall portion including a tab extending above the facilitating means side wall portions to permit manually grasping the facilitating means and cartridge top wall for pivoting the cartridge away from the supporting means front wall and thus away from the supporting means terminals.

10. The apparatus according to claim 8, wherein the cartridge is movable against a resilient force exerted by the spring finger members free-end portion and out of latching engagement thereby as the cartridge is pivoted toward the supporting means.

11. The apparatus according to claim 9, wherein the cartridge is movable against a resilient force exerted by the spring finger members free-end portion and into latching engagement thereby as the cartridge is pivoted away from the supporting means.

12. The apparatus according to claim 8, wherein the facilitating means includes a back wall portion, the facilitating means including oppositely spaced side wall portions extending forwardly from the supporting means to the back wall portion, and the back wall portion including a tab extending above the side wall portions to permit manually grasping the facilitating means and the cartridge top wall when the foot portion is seated in the shoe portions for pivoting the cartridge away from the supporting means.

13. The apparatus according to claim 1, wherein the cartridge is movable against a resilient force exerted by the spring finger member free end portions and into latching engagement thereby as the cartridge is pivoted away from the supporting means.

14. The apparatus according to claim 1, wherein the supporting means includes framework injection molded from a plastic material, the facilitating means including a frame integrally molded with the framework, and the frame including the spring finger members.

15. A printing apparatus, comprising:

(a) an inkjet printhead and a supply of ink therefor;

(b) means for controlling the printhead for ejecting ink droplets therefrom;

(c) a disposable cartridge including the ink supply and printhead, the cartridge including a substantially flat front wall and a base wall, the cartridge base wall including a foot portion extending to the cartridge front wall and defining therewith a lower frontal marginal edge, the cartridge including a rear wall opposite the cartridge front wall and opposed side walls extending therebetween, the cartridge including a first portion of the printhead controlling means, the first portion including a first substantially flat electrical connector overlaying the cartridge front wall, the first connector including a plurality of exposed first electrical terminals formed therein in a predetermined pattern;

(d) means for supporting the cartridge, the supporting means including a substantially flat front wall and opposed side walls extending rearwardly therefrom, the supporting means including a second portion of the printhead controlling means, the second portion including a second substantially flat electrical connector overlaying the supporting means front wall, the second connector including a plurality of exposed second electrical terminals formed therein in said predetermined pattern, the supporting means including oppositely spaced shoe portions extending both toward one another and forwardly of the supporting means front wall for positioning the cartridge terminals relative to the supporting means terminals when the cartridge is mounted on the supporting means, the supporting means including a latch fixedly attached to the supporting structure front wall whereby the top wall frontal lip portion of the cartridge may be urged against a resilient force exerted by the supporting structure latch into latching engagement with the latch;

(e) means for facilitating manually removably mounting the cartridge on the supporting means, the facilitating means including a pair of elongate spring finger members oppositely-spaced from one another for receiving therebetween the cartridge and blocking movement of the cartridge into engagement with the supporting means terminals, the spring finger members each including a free-end portion thereof configured for aligning the cartridge front wall with the supporting means shoe portions and guiding movement of the cartridge lower frontal edge into seating relationship with the supporting means shoe portions as the cartridge is being mounted on the supporting means.

16. The apparatus according to claim 15, wherein each of the spring finger member free-end portions extends transversely of the spring finger member and is an elongate portion having an arcuately-shaped transverse cross-section, and the free-end portions each longitudinally-extending at an angle of from ten to twenty degrees relative to the supporting means front wall.

17. The apparatus according to claim 16, wherein said angle is substantially fifteen degrees.

18. The apparatus according to claim 15, wherein said facilitating means includes oppositely-spaced side wall portions extending forwardly of the supporting means front wall, the facilitating means including an elongate back wall portion supported by the facilitating means side wall portions at an angle of from ten to twenty degrees relative to the supporting means front wall, and the spring finger members extending from the back wall portion toward the supporting means front wall.

19. The apparatus according to claim 18, wherein the angle is substantially fifteen degrees.

20. The apparatus according to claim 18, wherein each of the spring finger member free-end portions is an elongate portion longitudinally-extending substantially parallel to the back wall portion for receiving therebetween the cartridge.

21. The apparatus according to claim 15, wherein each of the spring finger member free-end portions is disposed in latching relationship with the cartridge front wall when the cartridge lower frontal marginal edge is seated on the supporting means shoe portions.

22. The apparatus according to claim 15, wherein the cartridge includes a top wall, the top wall including an elevated portion thereof configured to permit manually pivoting the cartridge toward the supporting means against a resilient force exerted by each of the spring finger members when the cartridge lower frontal edge is seated in the shoe portions for moving the cartridge terminals into electrical connection with the supporting means terminals and seating the foot portion on the shoe portions.

23. The apparatus according to claim 22, wherein the facilitating means includes oppositely-spaced side wall portions extending forwardly of the supporting means front wall, the facilitating means including a back wall portion supported by the facilitating means side wall portions a predetermined distance forwardly of the facilitating means spring finger member free end portions for receiving therebetween the cartridge, and the back wall portion including a tab extending above the facilitating means side wall portions to permit manually grasping the facilitating and cartridge top wall for pivoting the cartridge away from the supporting means to electrically disconnect the cartridge means terminals from the supporting means terminals.

24. The apparatus according to claim 22, wherein the cartridge is movable against a resilient force exerted by the spring finger member free-end portions and out of latching engagement thereby as the cartridge is pivoted toward the supporting means.

25. The apparatus according to claim 23, wherein the cartridge is movable against a resilient force exerted by the spring finger member free-end portions and into latching engagement thereby as the cartridge is pivoted away from the supporting means.

26. The apparatus according to claim 22, wherein the cartridge top wall includes a frontal lip portion formed therein, the supporting means including a latch extending therefrom and forwardly of the front wall thereof, wherein the cartridge is movable against a resilient force exerted by the latch as the cartridge is pivoted toward the supporting means, and wherein the latch resiliently holds the cartridge foot portion in seating relationship with the supporting means shoe portions when the cartridge terminals are disposed in electrical contact with the supporting means terminals.

27. The apparatus according to claim 26, wherein the facilitating means includes a back wall portion, the facilitating means including oppositely spaced side wall portions fixedly connected to the supporting means and extending forwardly thereof to the back wall portion, and the back wall portion including a tab extending above the side wall portions to permit manually grasping the facilitating means and the elevated portion of the cartridge top wall when the foot portion is seated in the shoe portions for pivoting the cartridge away from the supporting means to electrically disconnect the cartridge means terminals from the supporting means terminals.

28. The apparatus according to claim 15, wherein the cartridge is movable against a resilient force exerted by the spring finger member free end portions and into latching engagement thereby as the cartridge is pivoted away from the supporting means.

* * * * *